United States Patent
Kleshchev et al.

(10) Patent No.: US 12,312,079 B2
(45) Date of Patent: May 27, 2025

(54) AERODYNAMIC STRUCTURES AND METHODS OF FORMING AERODYNAMIC STRUCTURES

(71) Applicant: The Boeing Company, Chicago, IL (US)

(72) Inventors: Fedor Kleshchev, Seattle, WA (US); Daniel Carrasco, Seattle, WA (US)

(73) Assignee: The Boeing Company, Arlington, VA (US)

( * ) Notice: Subject to any disclaimer, the term of this patent is extended or adjusted under 35 U.S.C. 154(b) by 117 days.

(21) Appl. No.: 17/574,389

(22) Filed: Jan. 12, 2022

(65) Prior Publication Data

US 2022/0234719 A1    Jul. 28, 2022

Related U.S. Application Data

(60) Provisional application No. 63/140,659, filed on Jan. 22, 2021.

(51) Int. Cl.
*B64C 3/28* (2006.01)
*B64C 3/18* (2006.01)
(Continued)

(52) U.S. Cl.
CPC ............... *B64C 3/28* (2013.01); *B64C 3/185* (2013.01); *B64C 3/26* (2013.01); *F16B 19/1045* (2013.01)

(58) Field of Classification Search
CPC ............... B64C 3/28; B64C 3/26; B64F 5/10
See application file for complete search history.

(56) References Cited

U.S. PATENT DOCUMENTS

| | | |
|---|---|---|
| 1,803,030 A | 4/1931 | Messerschmitt |
| 1,875,593 A | 9/1932 | Hall |

(Continued)

FOREIGN PATENT DOCUMENTS

| | | |
|---|---|---|
| BR | 102017007099 A2 | 10/2017 |
| CA | 3000916 A1 | 12/2018 |

(Continued)

OTHER PUBLICATIONS

English language machine translation of Brazilian Patent Application Publication No. BR102017007099A2, published Oct. 10, 2017.

(Continued)

*Primary Examiner* — Michael H Wang
(74) *Attorney, Agent, or Firm* — Kolitch Romano Dascenzo Gates LLC

(57) ABSTRACT

Aerodynamic structures and methods of forming aerodynamic structures are disclosed herein. The aerodynamic structures include a first skin region that includes a first skin edge and a second skin region that includes a second skin edge. The first skin region and the second skin region are angled relative to one another and define a gap between the first skin edge and the second skin edge. The aerodynamic structures also include a trailing edge structure that extends within the gap and between the first skin edge and the second skin edge. The aerodynamic structures further include a plurality of blind fasteners. A first subset of the plurality of blind fasteners operatively interconnects the first skin region and the trailing edge structure. A second subset of the plurality of blind fasteners operatively interconnects the second skin region and the trailing edge structure. The methods include methods of forming the aerodynamic structures.

20 Claims, 9 Drawing Sheets

(51) Int. Cl.
  *B64C 3/26*  (2006.01)
  *F16B 19/10*  (2006.01)

(56) References Cited

U.S. PATENT DOCUMENTS

| | | | | |
|---|---|---|---|---|
| 2,473,728 | A * | 6/1949 | Rutledge | B64C 3/28 |
| | | | | 52/586.1 |
| 3,167,129 | A | 1/1965 | Shultz | |
| 3,333,642 | A | 8/1967 | Kee | |
| 3,910,531 | A | 10/1975 | Leomand | |
| 3,994,452 | A | 11/1976 | Cole | |
| 5,843,355 | A | 12/1998 | McCarville et al. | |
| 7,393,183 | B2 | 7/2008 | Keller | |
| 7,871,041 | B2 * | 1/2011 | Brice | B64F 5/00 |
| | | | | 244/123.7 |
| 8,684,309 | B2 | 4/2014 | Wildman | |
| 8,853,313 | B2 | 10/2014 | Miller | |
| 9,522,504 | B2 | 12/2016 | Garcia Martin et al. | |
| 9,656,738 | B2 | 5/2017 | Murta et al. | |
| 9,745,048 | B2 | 8/2017 | Wood | |
| 10,173,789 | B2 | 1/2019 | Rodman | |
| 10,228,005 | B2 | 3/2019 | Wilson et al. | |
| 10,532,804 | B2 * | 1/2020 | Santini | B64C 3/28 |
| 2004/0000613 | A1 * | 1/2004 | Thomas, Jr. | B64C 3/28 |
| | | | | 244/10 |
| 2005/0227582 | A1 | 10/2005 | Kloos | |
| 2005/0238491 | A1 * | 10/2005 | Morrison | F01D 5/187 |
| | | | | 416/229 R |
| 2008/0258008 | A1 | 10/2008 | Cooper | |
| 2010/0065687 | A1 * | 3/2010 | Douglas | B64C 3/28 |
| | | | | 244/130 |
| 2010/0155528 | A1 * | 6/2010 | Balsa Gonzalez | B64C 9/00 |
| | | | | 244/123.1 |
| 2010/0308170 | A1 | 12/2010 | Hadley et al. | |
| 2014/0339370 | A1 * | 11/2014 | De Gregorio Hurtado | |
| | | | | B64C 3/20 |
| | | | | 244/35 R |
| 2015/0129714 | A1 * | 5/2015 | Wei | B64C 3/28 |
| | | | | 244/99.2 |
| 2015/0353185 | A1 | 12/2015 | Petiot et al. | |
| 2016/0244143 | A1 | 8/2016 | Foster et al. | |
| 2017/0327203 | A1 * | 11/2017 | Holmes | B64C 3/26 |
| 2017/0341774 | A1 * | 11/2017 | Ding | B64C 3/20 |
| 2018/0043639 | A1 | 2/2018 | Autry et al. | |
| 2018/0057142 | A1 | 3/2018 | Wilkerson | |
| 2018/0086429 | A1 | 3/2018 | Sheppard et al. | |
| 2018/0127080 | A1 | 5/2018 | Tyler et al. | |
| 2018/0155004 | A1 | 6/2018 | Woolcock | |
| 2018/0155006 | A1 * | 6/2018 | Arana Hidalgo | B64C 1/26 |
| 2018/0222571 | A1 | 8/2018 | Santini | |
| 2018/0346094 | A1 | 12/2018 | Deck et al. | |
| 2019/0061901 | A1 | 2/2019 | Long | |
| 2020/0149419 | A1 * | 5/2020 | Peeters | F03D 1/0675 |
| 2020/0231270 | A1 * | 7/2020 | Kobierecki | B64C 9/00 |
| 2021/0347464 | A1 * | 11/2021 | Knübel | B64C 3/26 |
| 2021/0362826 | A1 | 11/2021 | Santini et al. | |
| 2021/0362827 | A1 | 11/2021 | Reinhart et al. | |
| 2021/0362828 | A1 | 11/2021 | Gruner et al. | |
| 2021/0362829 | A1 | 11/2021 | Reinhart et al. | |
| 2021/0362830 | A1 | 11/2021 | Gruner et al. | |
| 2021/0362831 | A1 | 11/2021 | Gruner et al. | |
| 2021/0362832 | A1 | 11/2021 | Kordel et al. | |
| 2021/0362833 | A1 | 11/2021 | Gruner et al. | |
| 2021/0362834 | A1 | 11/2021 | Kordel et al. | |

FOREIGN PATENT DOCUMENTS

| | | |
|---|---|---|
| DE | 3726909 A1 | 2/1989 |
| EP | 1176089 | 1/2002 |
| EP | 3360778 | 8/2018 |
| EP | 3409580 | 12/2018 |
| GB | 2266085 A | 10/1993 |
| WO | WO2014170690 | 10/2014 |

OTHER PUBLICATIONS

English language machine translation of Canadian Patent Application Publication No. CA3000916A1, published Dec. 1, 2018.

\* cited by examiner

AERODYNAMIC STRUCTURES AND METHODS OF FORMING AERODYNAMIC STRUCTURES

RELATED APPLICATION

The present application is a non-provisional of and claims priority to U.S. Provisional Patent Application No. 63/140,659, filed on Jan. 22, 2021, entitled "AERODYNAMIC STRUCTURES AND METHODS OF FORMING AERODYNAMIC STRUCTURES," the complete disclosure of which is incorporated by reference.

FIELD

The present disclosure relates generally to aerodynamic structures and methods of forming aerodynamic structures.

BACKGROUND

Aerodynamic structures may be utilized with various crafts, such as aircraft, helicopters, spacecraft, and/or marine craft. In such contexts, aerodynamic structures may be utilized to reduce and/or tailor resistance to fluid flow past the craft. Many aerodynamic structures include two surfaces that come together, or terminate, in a trailing edge region. It often may be challenging to economically fabricate this trailing edge region and/or to conserve weight within this trailing edge region. Moreover, it is challenging to create an arrangement that is structurally efficient, durable, strong, and accessible in a limited size space. Thus, there exists a need for improved aerodynamic structures and/or for improved methods of forming aerodynamic structures.

SUMMARY

Aerodynamic structures and methods of forming aerodynamic structures are disclosed herein. The aerodynamic structures include a first skin region that includes a first skin edge and a second skin region that includes a second skin edge. The first skin region and the second skin region are angled relative to one another and define a gap between the first skin edge and the second skin edge. The aerodynamic structures also include a trailing edge structure that extends within the gap and between the first skin edge and the second skin edge. The aerodynamic structures further include a plurality of blind fasteners. A first subset of the plurality of blind fasteners operatively interconnects the first skin region and the trailing edge structure. A second subset of the plurality of blind fasteners operatively interconnects the second skin region and the trailing edge structure.

The methods include positioning a trailing edge structure within a gap between a first skin edge of a first skin region and a second skin edge of a second skin region. The methods also include operatively attaching the first skin region and the second skin region to the trailing edge structure utilizing a plurality of blind fasteners. The operatively attaching includes operatively attaching such that a first subset of the plurality of blind fasteners operatively interconnects the first skin region and the trailing edge structure and also such that a second subset of the plurality of blind fasteners operatively interconnects the second skin region and the trailing edge structure.

DESCRIPTION

Figure 1:
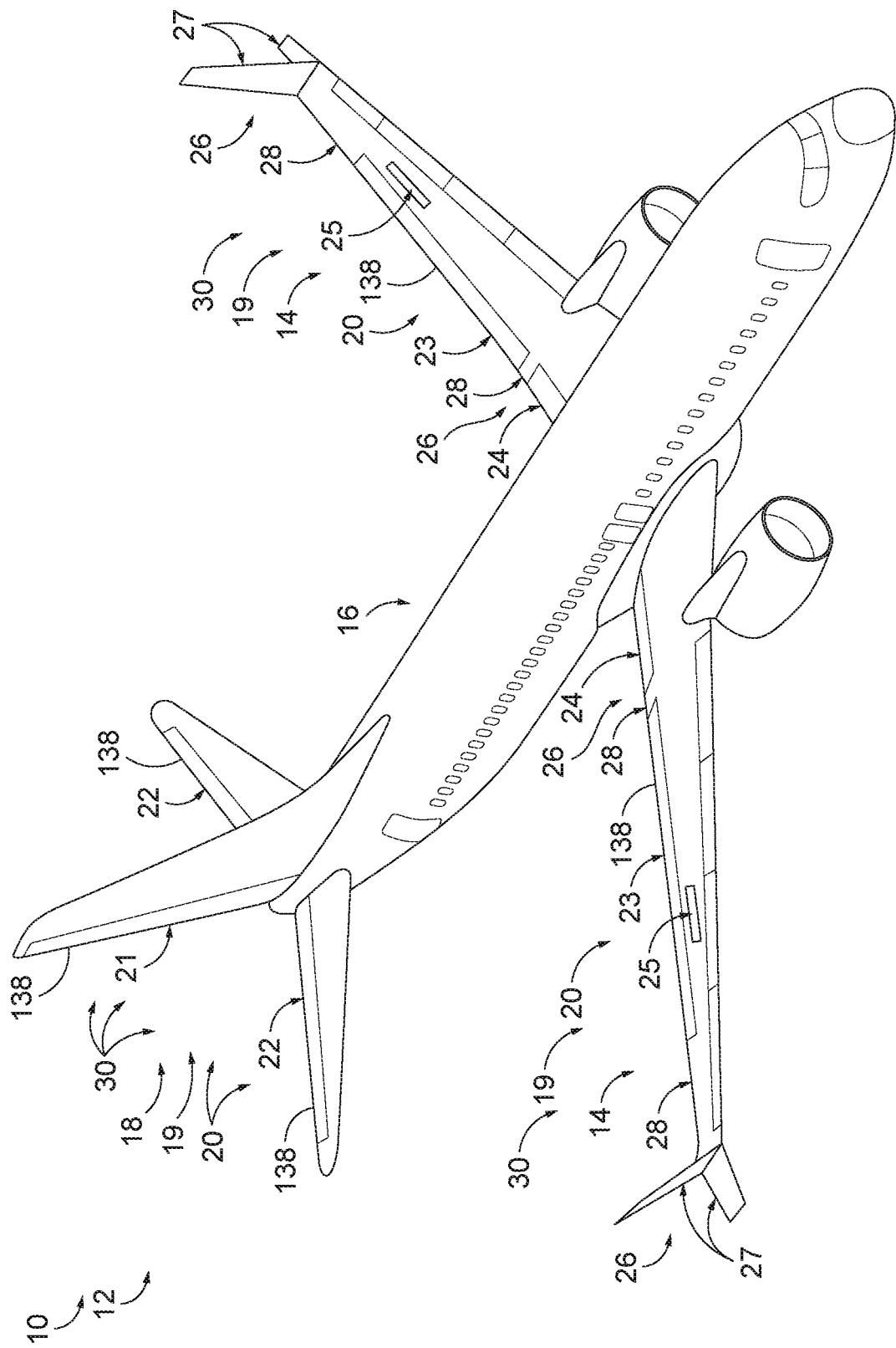
FIG. 1 is a schematic illustration of a craft, in the form of an aircraft, that may include and/or utilize aerodynamic structures, according to the present disclosure.

FIGS. 1-9 provide illustrative, non-exclusive examples of aerodynamic structures 30 and/or of craft 10 that include aerodynamic structures 30, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of a craft 10, in the form of an aircraft 12, that may include and/or utilize aerodynamic structures 30, according to the present disclosure. As illustrated, aircraft 12 may include a plurality of components, including wings 14, an airframe 16, and/or a tail 18. One or more of these components may include an aerodynamic surface 19, such as a control surface 20 and/or a fixed surface 26. Examples of control surfaces 20 include a rudder 21, an elevator 22, an aileron 23, a flap 24, and/or a spoiler 25. Examples of fixed surface 26 include a winglet 27 and/or a fixed region 28 of wings 14. Control surfaces 20 and/or fixed surfaces 26 may include and/or may define a trailing edge 138, and aerodynamic structures 30 may form and/or define at least a portion and/or region of trailing edge 138. While FIG. 1 illustrates craft 10 in the form of aircraft 12, it is within the scope of the present disclosure that aerodynamic structures 30 may be included in and/or may form a portion of any suitable craft 10. Additional examples of craft 10 include a helicopter, a spacecraft, and/or a marine craft.

Figure 2:
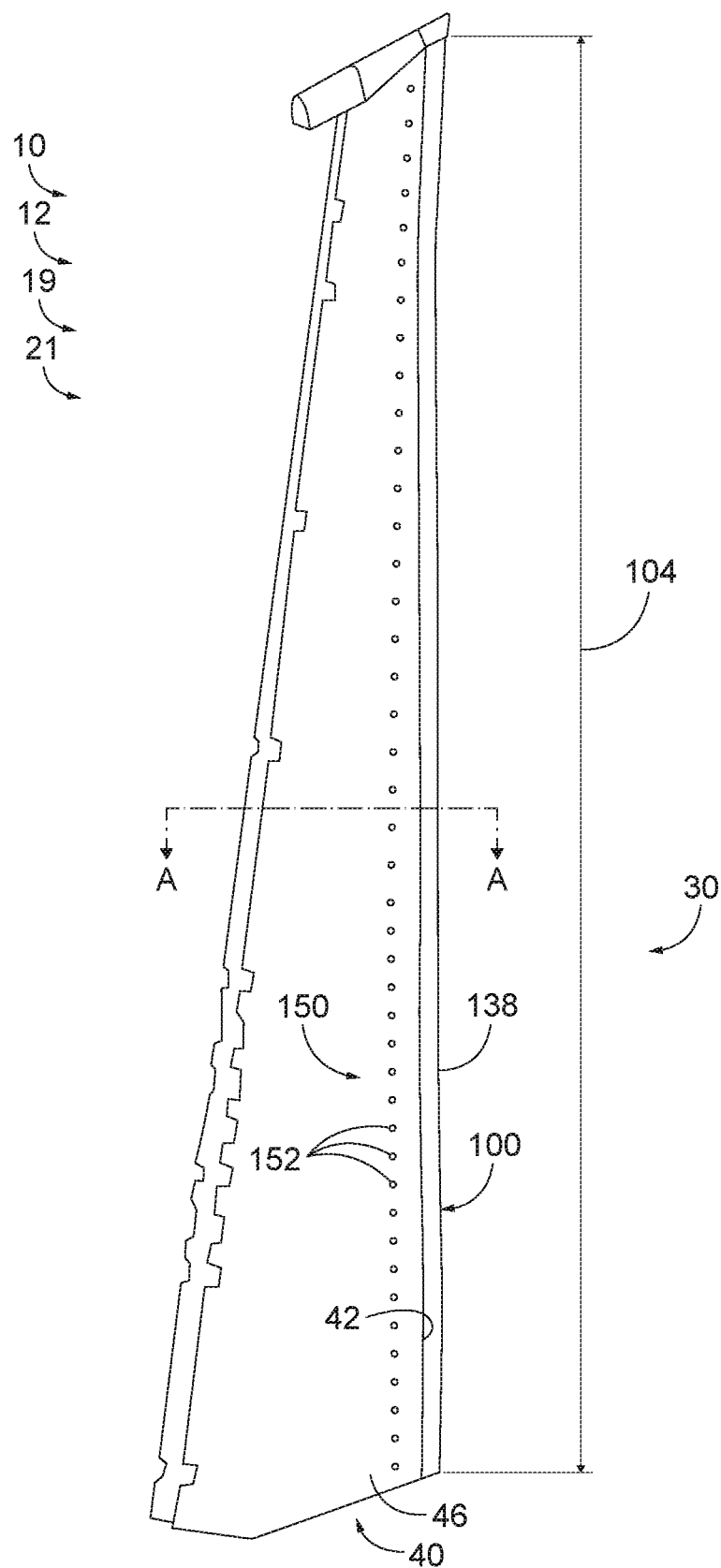
FIG. 2 is a more detailed view of an aerodynamic surface according to the present disclosure.
Figure 3:
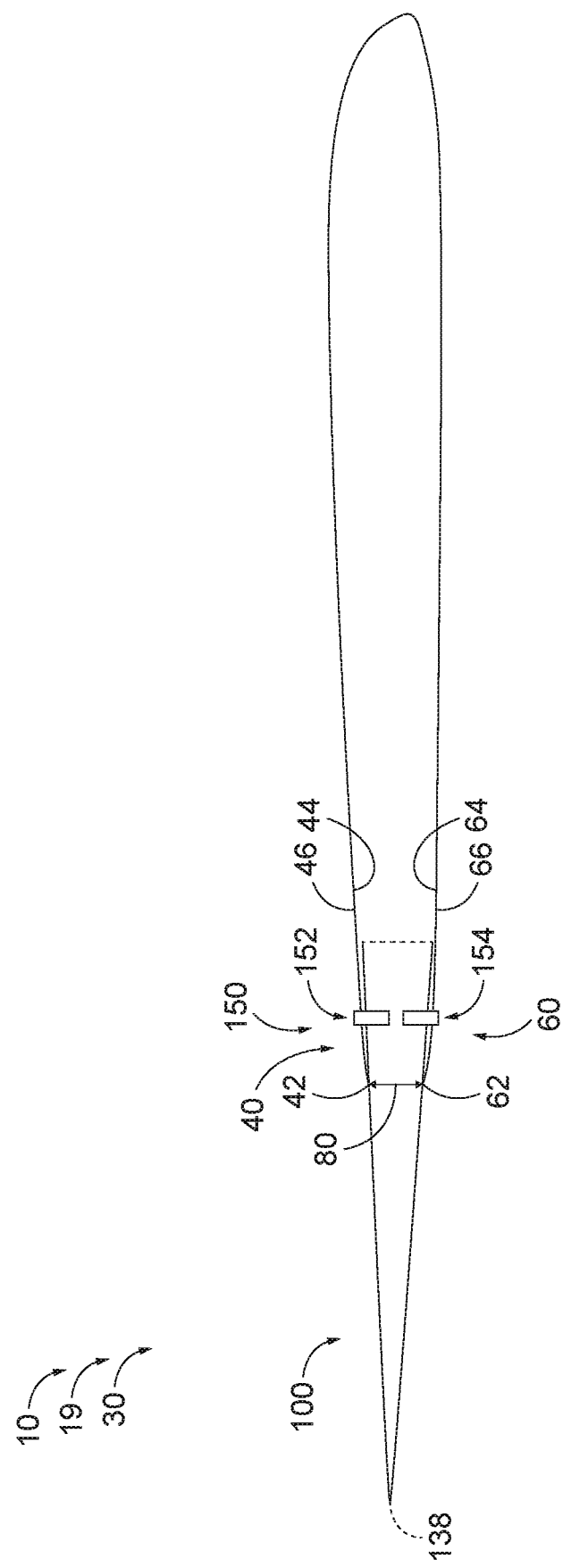
FIG. 3 is a schematic cross-sectional view of an aerodynamic surface according to the present disclosure.
Figure 4:
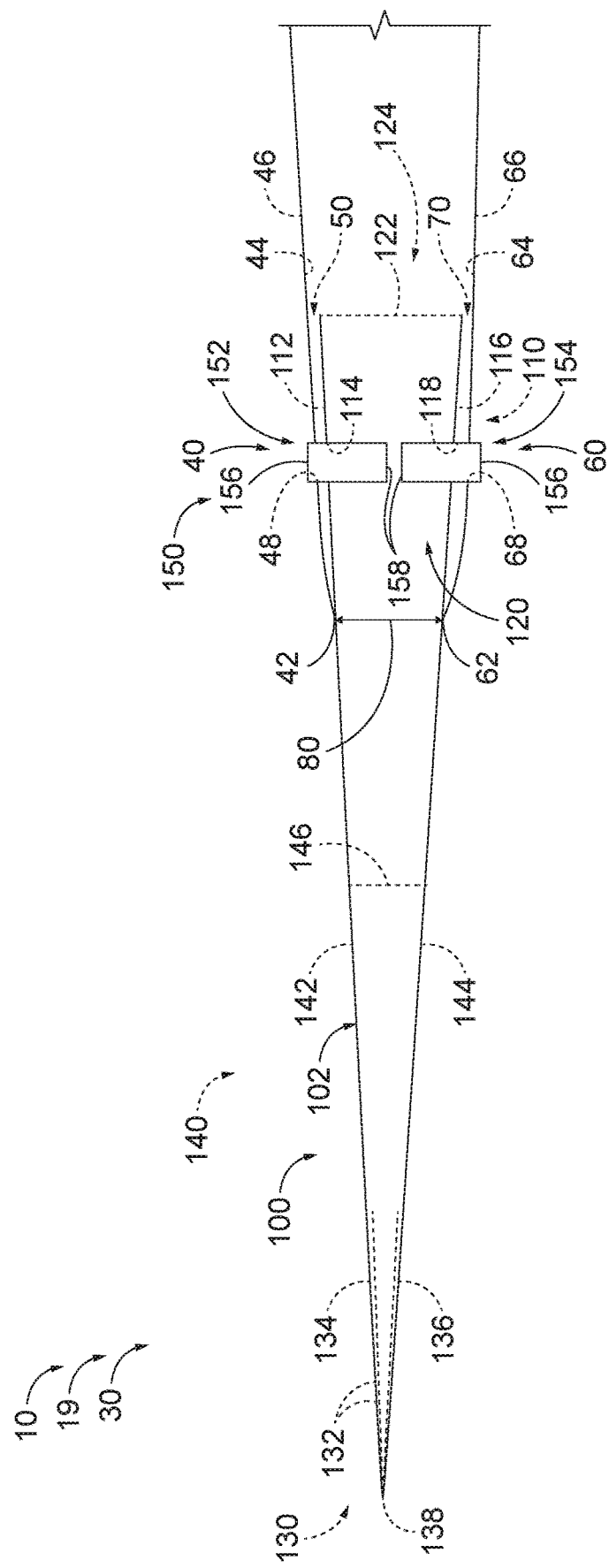
FIG. 4 is a more detailed view of a region of the aerodynamic surface of FIG. 3.
Figure 5:
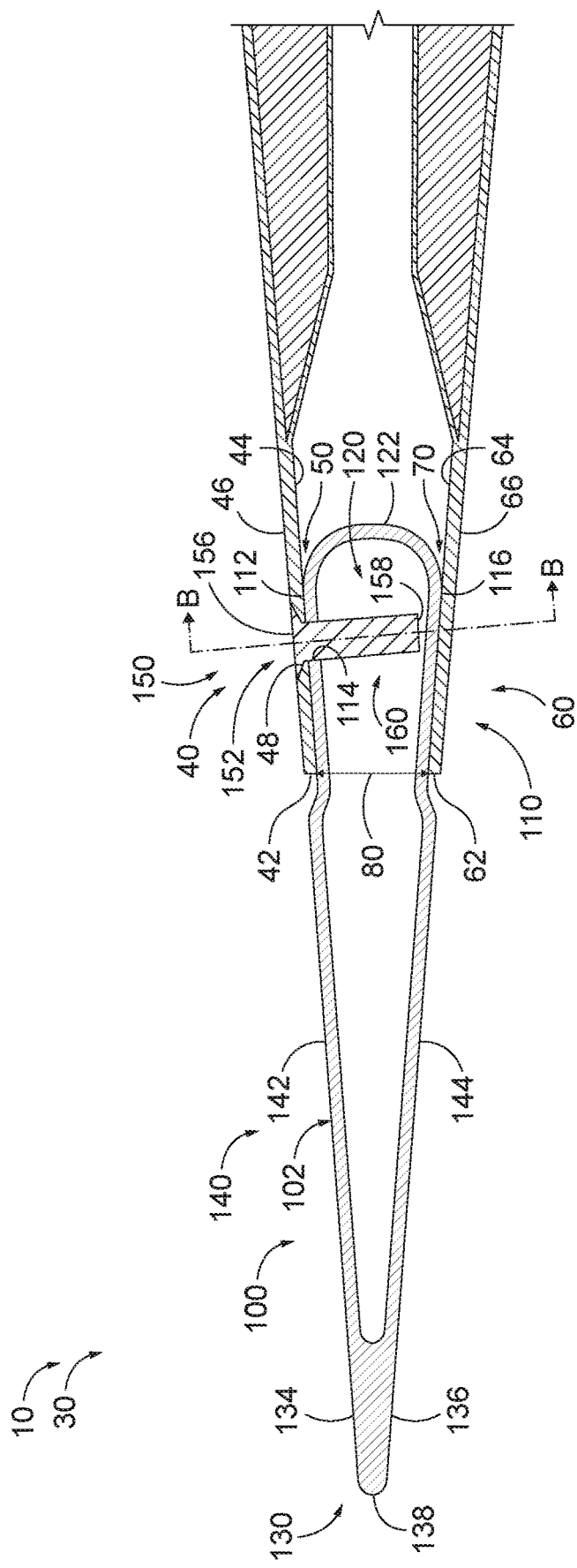
FIG. 5 is a schematic cross-sectional view of another aerodynamic surface according to the present disclosure.
Figure 6:
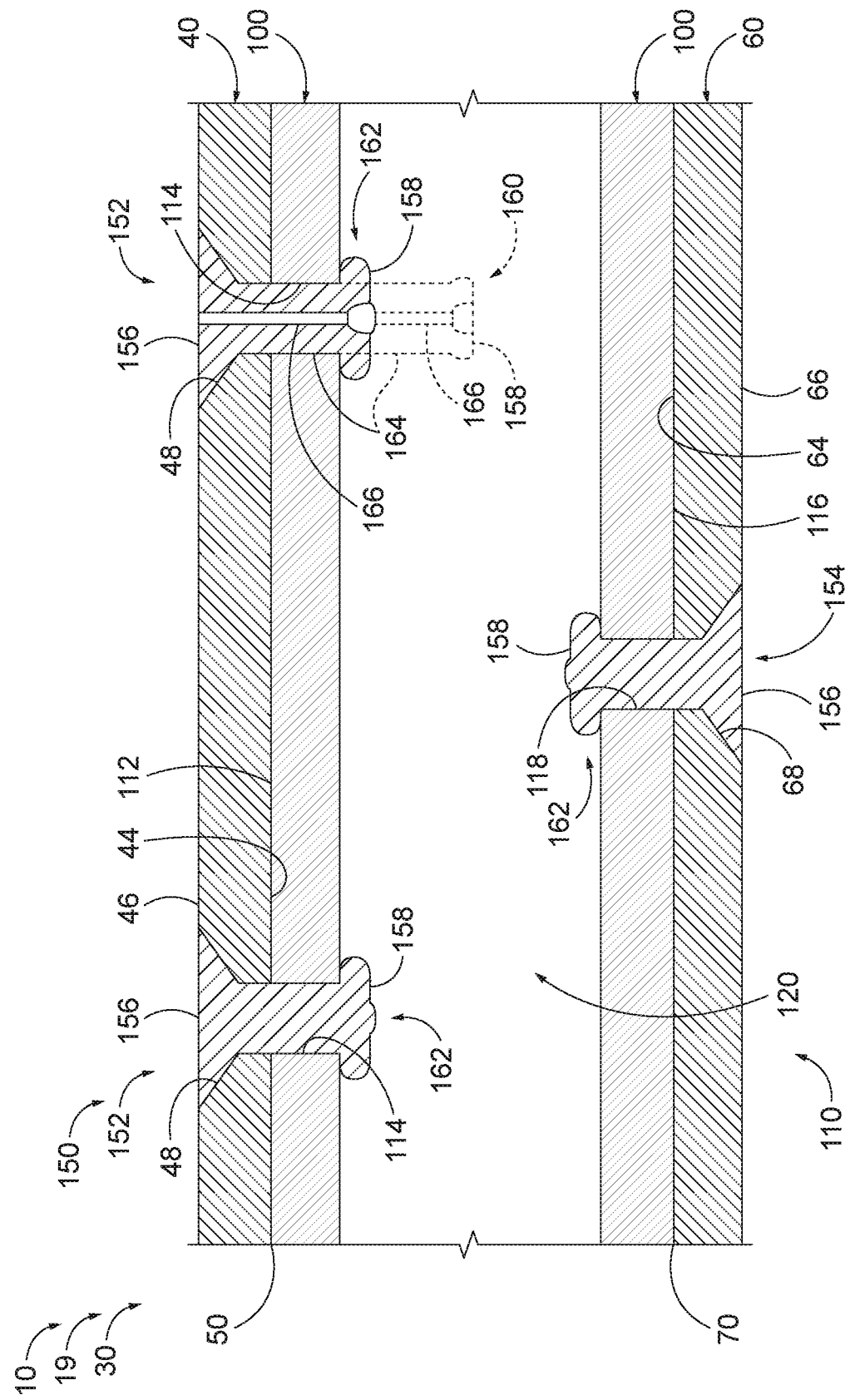
FIG. 6 is a cross-sectional view of the aerodynamic surface of FIG. 5 taken along line B-B of FIG. 5.
Figure 7:
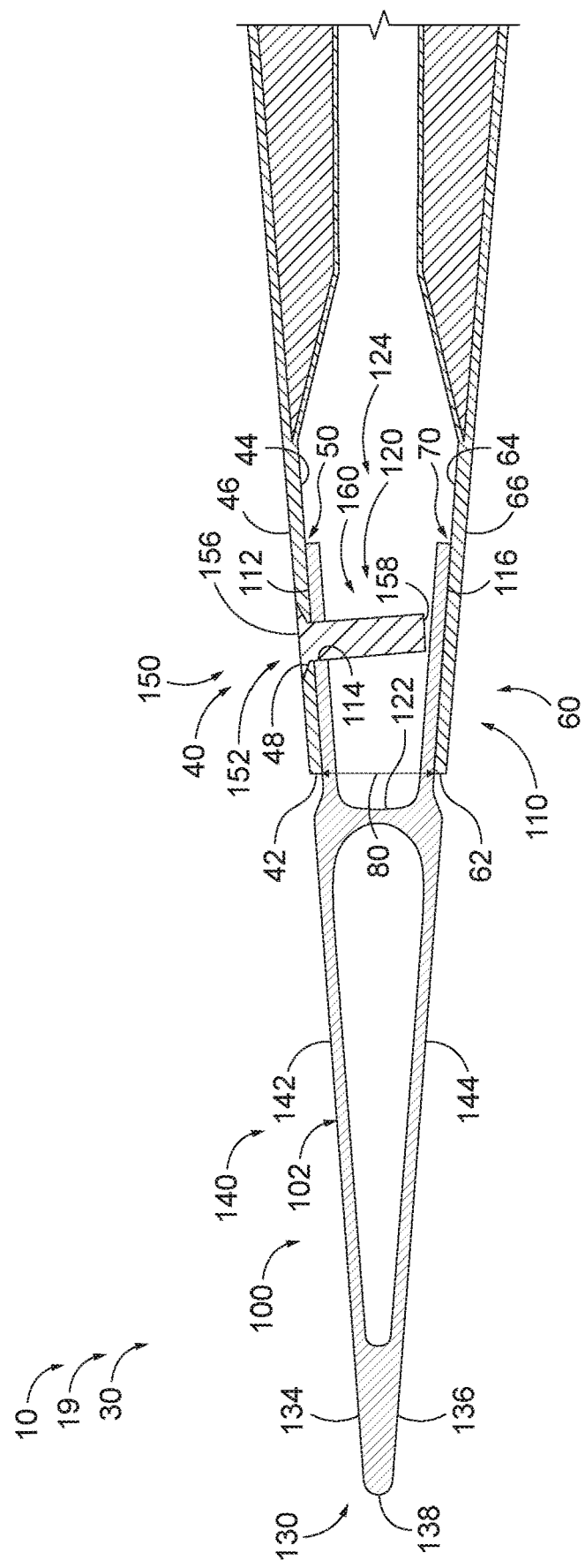
FIG. 7 is a schematic cross-sectional view of another aerodynamic surface according to the present disclosure.
Figure 8:
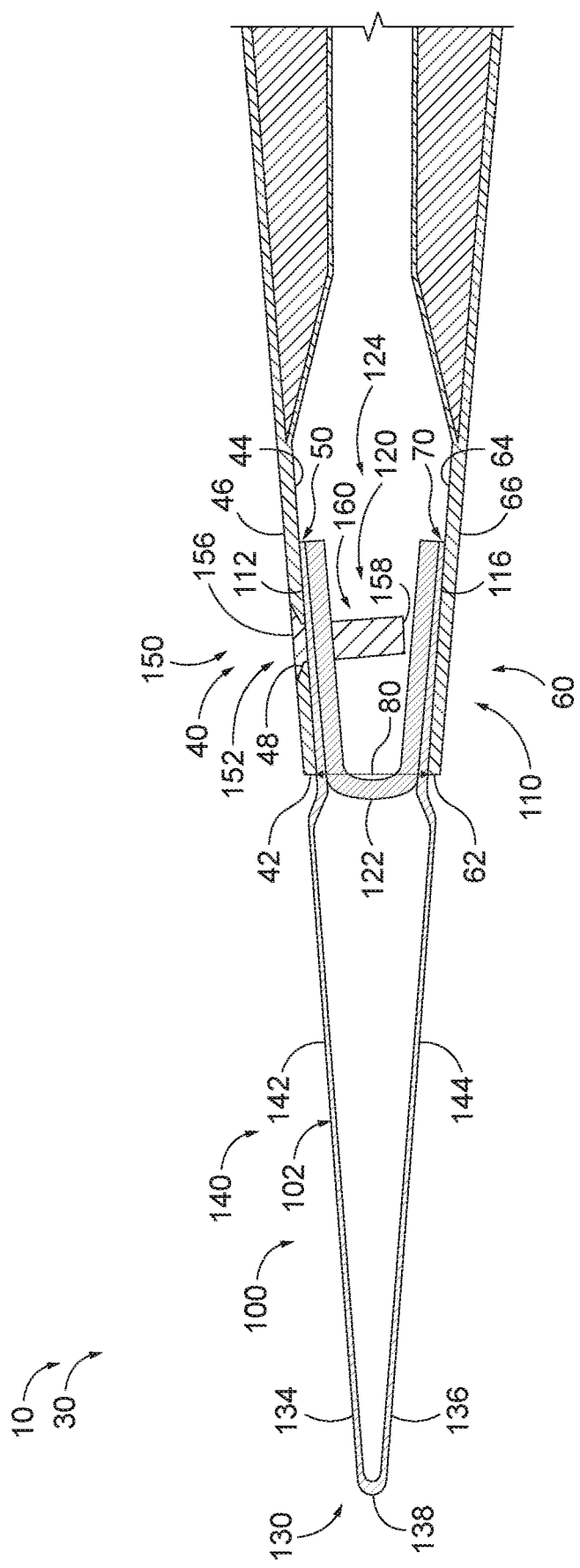
FIG. 8 is a schematic cross-sectional view of another aerodynamic surface according to the present disclosure.
Figure 9:
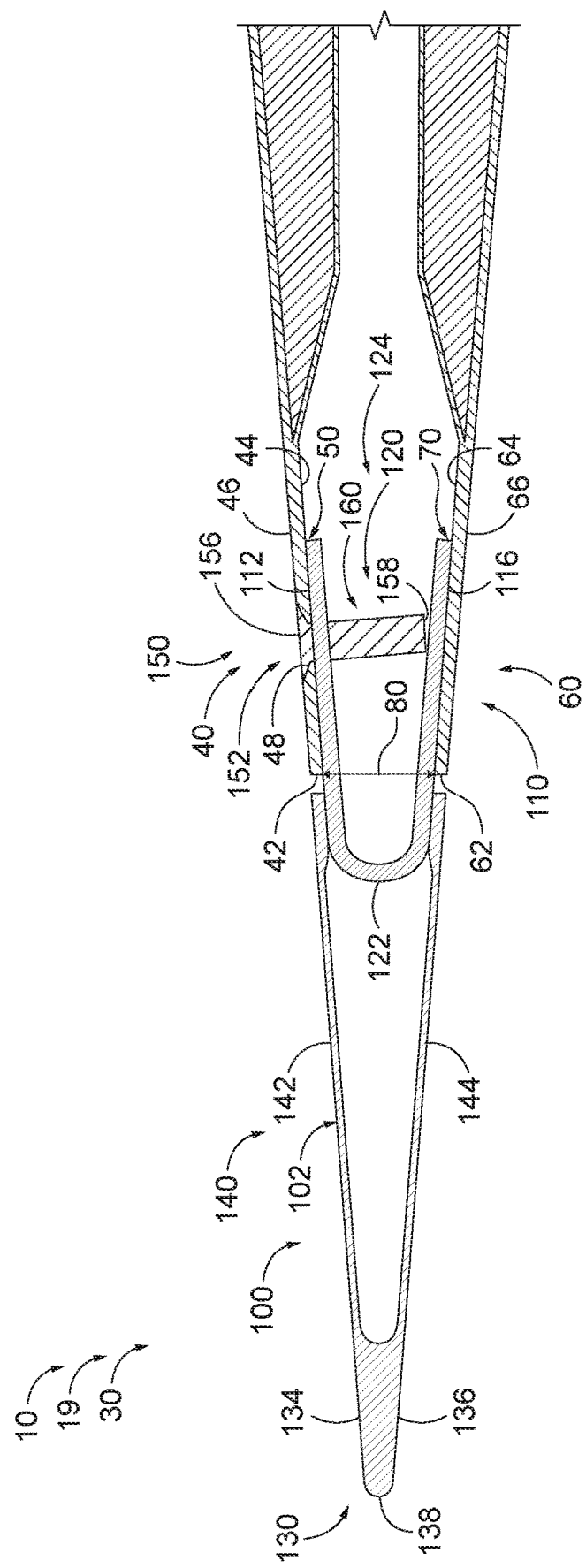
FIG. 9 is a schematic cross-sectional view of another aerodynamic surface according to the present disclosure.

FIG. 2 is a more detailed view of an aerodynamic surface 19, according to the present disclosure, in the form of a rudder 21. FIG. 3 is a schematic cross-sectional view of an aerodynamic surface 19 according to the present disclosure, and FIG. 4 is a more detailed view of a region of aerodynamic surface 19 of FIG. 3. FIG. 5 is a schematic cross-sectional view of another aerodynamic surface 19 according to the present disclosure, and FIG. 6 is a cross-sectional view of aerodynamic surface 19 of FIG. 5 taken along line B-B of FIG. 5. FIG. 7 is a schematic cross-sectional view of another aerodynamic surface 19 according to the present disclosure; FIG. 8 is a schematic cross-sectional view of yet another aerodynamic surface 19 according to the present disclosure; and FIG. 9 is a schematic cross-sectional view of another aerodynamic surface 19 according to the present disclosure. While not required, FIGS. 3-5 and 7-9 may include and/or be cross-sectional views of aerodynamic surface 19 of FIG. 2 taken along line A-A of FIG. 2.

As collectively illustrated by FIGS. 2-9, aerodynamic surfaces 19 include an aerodynamic structure 30, according to the present disclosure. Aerodynamic structure 30 includes a first skin region 40 that includes and/or defines a first skin edge 42 and a second skin region 60 that includes and/or defines a second skin edge 62. First skin region 40 and second skin region 60 may be angled relative to one another to define a gap 80 between first skin edge 42 and second skin edge 62, as illustrated in FIGS. 3-9. In some examples, and as also illustrated, first skin region 40 and second skin region 60 may be angled relative to one another and/or may be oriented at a skew angle relative to one another. Stated another way, and in some such examples, first skin region 40 and second skin region 60 may not be parallel to one another and/or may taper toward one another. This taper may be such that a distance between first skin region 40 and second skin region 60 decreases toward first skin edge 42, toward second skin edge 62, and/or toward gap 80.

As also collectively illustrated by FIGS. 2-9, aerodynamic structure 30 includes a trailing edge structure 100. Trailing edge structure 100 extends and/or is positioned within gap 80. Additionally or alternatively, trailing edge structure 100 extends and/or is positioned between first skin region 40 and second skin region 60 and/or between first skin edge 42 and second skin edge 62. Trailing edge structure 100 may define, or may be referred to herein as defining, a trailing edge 138 of aerodynamic surfaces 19 and/or of aerodynamic structure 30.

As further collectively illustrated by FIGS. 2-9, aerodynamic structure 30 includes a plurality of blind fasteners 150. A first subset 152 of blind fasteners 150 operatively interconnects, or attaches, first skin region 40 and trailing edge structure 100. A second subset 154 of blind fasteners 150 operatively interconnects, or attaches, second skin region 60 and trailing edge structure 100.

First skin region 40 may include and/or be any suitable structure and/or structures. As examples, first skin region 40 may include and/or be a first composite skin, a first fiber-reinforced composite skin, a first plurality of layered plies of composite material, and/or a first cured, or pre-cured, composite skin. Similarly, second skin region 60 may include and/or be a second composite skin, a second fiber-reinforced composite skin, a second plurality of layered plies of composite material, and/or a second cured, or pre-cured, composite skin.

First skin region 40 may have and/or define a first skin inner surface 44 and/or a first skin outer surface 46. First skin inner surface 44 may face toward second skin region 60, may face toward trailing edge structure 100, may be in contact with trailing edge structure 100, and/or may be in direct physical contact with trailing edge structure 100. First skin outer surface 46 may face away from second skin region 60 and/or may face away from trailing edge structure 100. Stated another way, first skin region 40 may define a first interface 50 with trailing edge structure 100. In some examples, first skin outer surface 46 may include and/or be an aerodynamically smooth first skin outer surface, such as may define at least a region of aerodynamic surface 19.

Similarly, second skin region 60 may have and/or define a second skin inner surface 64 and/or a second skin outer surface 66. Second skin inner surface 64 may face toward first skin region 40, may face toward trailing edge structure 100, may be in contact with trailing edge structure 100, and/or may be in direct physical contact with trailing edge structure 100. Second skin outer surface 66 may face away from first skin region 40 and/or may face away from trailing edge structure 100. Stated another way, second skin region 60 may define a second interface 70 with trailing edge structure 100. In some examples, second skin outer surface 66 may include and/or be an aerodynamically smooth second skin outer surface, such as may define at least a region of aerodynamic surface 19.

Trailing edge structure 100 may include and/or be any suitable structure that may be positioned within gap 80, may be operatively attached to first skin region 40 and/or second skin region 60 via blind fasteners 150, and/or may define trailing edge 138. In some examples, trailing edge structure 100 may include, be, consist of, and/or consist essentially of a monolithic trailing edge structure, a unitary trailing edge structure, a one-piece trailing edge structure, a continuously formed trailing edge structure, and/or an integrally formed trailing edge structure. Such a configuration, which is illustrated in FIGS. 5 and 7, may decrease an overall weight of aerodynamic structures 30, may increase a strength of aerodynamic structures 30, and/or may facilitate improved, faster, and/or more efficient assembly of aerodynamic structures 30. However, this is not required, and it is also within the scope of the present disclosure that trailing edge structure 100 may include and/or be a multi-component, or a multi-piece, trailing edge structure, as illustrated in FIGS. 8-9.

Similar to first skin region 40 and/or second skin region 60, trailing edge structure 100 may include and/or be a composite trailing edge structure, a fiber-reinforced composite trailing edge structure, and/or a cured, or pre-cured, composite trailing edge structure. In some such examples, trailing edge structure 100 may be formed from a trailing edge plurality of plies of composite material. Examples of the trailing edge plurality of plies of composite material include at least 2, at least 3, at least 4, at least 5, at least 6, at last 7, at most 20, at most 18, at most 16, at most 14, at most 12, at most 10, at most 9, at most 8, at most 7, at most 6, at most 5, and/or at most 4 layered plies of composite material.

In some examples, trailing edge structure 100 may have and/or define an outer trailing edge structure surface 102, as illustrated in FIGS. 4-5 and 7-9. Outer trailing edge structure surface 102 may be in contact, or in direct physical contact, with first skin region 40 and/or with second skin region 60. Similar to first skin outer surface 46 and/or second skin outer surface 66, outer trailing edge structure surface 102 may be an aerodynamically smooth outer trailing edge structure surface, such as may define at least a region of aerodynamic surface 19.

As illustrated in FIGS. 4-5 and 7-9, trailing edge structure 100 may have, include, and/or define a leading region 110, a trailing region 130, and a transition region 140. Leading region 110 may be positioned within, or at least partially within, gap 80. Trailing region 130 may define trailing edge 138. Transition region 140 may extend from leading region 110 to trailing region 130 and/or may extend between leading region 110 and trailing region 130.

As illustrated in FIGS. 4-9, leading region 110 may have and/or define a first leading region surface 112 and a second leading region surface 116. First leading region surface 112 may face toward first skin region 40, may be in contact with first skin region 40, and/or may be in direct physical contact with first skin region 40. Similarly, second leading region surface 116 may face toward second skin region 60, may be in contact with second skin region 60, and/or may be in direct physical contact with second skin region 60.

First skin region 40 may have and/or define a first plurality of skin holes 48 and second skin region 60 may have and/or define a second plurality of skin holes 68. Similarly, first leading region surface 112 may have and/or define a first plurality of structure holes 114 and second leading region surface 116 may have and/or define a second plurality of structure holes 118. Each blind fastener of first subset 152 of the plurality of blind fasteners 150 may extend through a corresponding first skin hole of the first plurality of skin holes 48 and also through a corresponding first structure hole of the first plurality of structure holes 114. Similarly, each blind fastener of second subset 154 of the plurality of blind fasteners 150 may extend through a corresponding second skin hole of the second plurality of skin holes 68 and also through a corresponding second structure hole of the second plurality of structure holes 118.

In some examples, leading region 110 may have, define, bound, and/or at least partially bound a leading region void space 120. Leading region void space 120, when present, may extend at least partially between first leading region surface 112 and second leading region surface 116. In addition, each blind fastener of the plurality of blind fasteners 150 may include and/or define a corresponding exposed end 156 and a corresponding unexposed end 158. Corresponding exposed end 156 may form and/or define at least a region of an outer surface of aerodynamic structure 30. In contrast, corresponding unexposed end 158 may be internal to aerodynamic structure 30, may be inaccessible from external to aerodynamic structure 30, and/or may be positioned within leading region void space 120. Stated another way, blind fasteners 150 may not extend through, or entirely through, aerodynamic structure 30, blind fasteners 150 may extend through only one of first skin region 40 and second skin region 60, and/or each blind fastener 150 may extend through a single, or only a single, corresponding hole within leading region 110.

In some examples, and as illustrated in dashed lines in FIG. 4 and in solid lines in FIGS. 5 and 7-9, leading region 110 may include and/or define a leading spar 122. Leading spar 122, when present, may extend at least partially, or even completely between first skin region 40 and second skin region 60, such as to support normal forces that may be directed between first skin region 40 and second skin region 60. Additionally or alternatively, leading spar 122 may extend along, at least partially along, or along an entirety of a longitudinal length of trailing edge structure 100, as indicated in FIG. 2 at 104. In some examples, leading spar 122 may include and/or be a leading C-spar. In some such examples, and as illustrated in FIG. 5, the leading C-spar may be concave toward trailing region 130 and/or may open toward trailing region 130. In some examples, and as illustrated in FIGS. 7-9, the leading C-spar may be convex toward trailing region 130 and/or may open away from the trailing region. In examples of leading region 110 that include leading spar 122, leading region 110 may include an inspection opening 124, as illustrated in FIGS. 4 and 7-9. Inspection opening 124, when present, may permit and/or facilitate viewing of a region of blind fasteners 150 that is positioned within leading region void space 120. Such a configuration may permit visual determination and/or verification of an actuation state of blind fasteners 150.

Trailing region 130 may have and/or define any suitable shape. As an example, and as illustrated in FIGS. 3-4, trailing region 130 may have and/or define a duckbill, or an at least partially triangular, transverse cross-sectional shape. As another example, and as illustrated in FIGS. 5 and 7-9, trailing region 130 may have and/or define a wedge transverse cross-sectional shape.

In some examples, trailing region 130 may be free of a joint, such as within a material that defines trailing region 130. Additionally or alternatively, trailing region 130 may be free of a joint at and/or within trailing edge 138. As an example, and as illustrated in FIG. 4, trailing region 130 may be defined by a plurality of trailing region plies of composite material 132. In such a configuration, at least one trailing region ply of the plurality of trailing region plies of composite material 132 may wrap around, may extend around, and/or may not terminate within trailing edge 138. Such a configuration may increase a structural rigidity of trailing region 130 and/or may decrease a potential for separation of trailing edge structure 100 at and/or along trailing edge 138.

In some examples, trailing region 130 may have and/or define a first trailing region outer surface 134 and a second trailing region outer surface 136. In some such examples, first trailing region outer surface 134 and second trailing region outer surface 136 may be angled relative to one another, may be oriented at a skew angle relative to one another, may not be parallel to one another, may taper toward trailing edge 138, and/or may meet at trailing edge 138.

Transition region 140 may have and/or define any suitable structure and/or shape. In some examples, transition region 140 may taper from leading region 110 to trailing region 130 and/or may monotonically taper from leading region 110 to trailing region 130. In some examples, transition region 140 may define a first exposed transition region surface 142 and a second exposed transition region surface 144. In some such examples, first exposed transition region surface 142 and second exposed transition region surface 144 may be angled relative to one another, may be oriented at a skew angle relative to one another, may not be parallel to one another, may taper toward trailing region 130, and/or may monotonically taper toward trailing region 130.

In some examples, and as illustrated in FIG. 4, transition region 140 may include a transition region spar 146. Transition region spar 146, when present, may increase a rigidity of trailing edge structure 100 and/or may increase a rigidity of transition region 140 thereof. Additionally or alternatively, transition region spar 146 may increase a resistance to deflection of first exposed transition region surface 142 and/or of second exposed transition region surface 144, such as may be caused by loads, normal loads, and/or aerodynamic loads applied to trailing edge structure 100 during operative use of trailing edge structure 100.

Blind fasteners 150 may include and/or be any suitable fastener that may be utilized to operatively interconnect first skin region 40 and/or second skin region 60 to trailing edge structure 100 and that also may be actuated only from exposed end 156 thereof. Stated another way, and as used herein, the phrases "blind fastener" or "blind fasteners" refers to fasteners that may be utilized to operatively attach two or more components together via operative engagement with only a single side, or end, of the blind fastener (e.g., exposed end 156) and/or without operative engagement with an opposed side, or end of the blind fasteners (e.g., unexposed end 158).

With the above in mind, each blind fastener 150 may be, or is, configured to operatively attach a corresponding skin area of either first skin region 40 or second skin region 60 to trailing edge structure 100. Stated another way, each blind fastener 150 does not operatively attach a corresponding skin area of both the first skin region 40 and the second skin region 60 to trailing edge structure 100. Examples of blind fasteners 150 include a blind rivet, a pull rivet, a pop rivet, a self-retaining fastener, and/or a self-tapping fastener.

As discussed, blind fasteners 150 may be configured to be actuated only from a single side, or end, such as exposed end 156. Such actuation may transition blind fasteners 150 from an unactuated state 160, as perhaps best illustrated in solid lines in FIGS. 5 and 7-9 and in dashed lines in FIG. 6, to an actuated state 162, as perhaps best illustrated in solid lines in FIG. 6. In examples of blind fasteners 150 that include blind rivets, pull rivets, and/or pop rivets, and as illustrated in FIG. 6, blind fasteners 150 may include a fastener body 164 and a stem 166. During operative attachment of first skin region 40 or second skin region 60 to trailing edge structure 100 utilizing such blind fasteners 150, blind fasteners 150 first may be inserted into corresponding holes in trailing edge structure 100 and also in first skin region 40 or second skin region 60 while in unactuated state 160. Subsequently, stem 166 may be pulled, or drawn, away from exposed end 156, thereby pulling unexposed end 158 toward exposed end 156 to transition blind fastener 150 to actuated state 162. This actuation may compress trailing edge structure 100 and first skin region 40 or second skin region 60 between exposed end 156 and unexposed end 158, thereby accomplishing the operative attachment.

With the above in mind, blind fasteners 150 are not, or may be referred to herein as not being, double-sided rivets and/or crush rivets. Stated another way, blind fasteners 150 do not require access to two opposed ends thereof for actuation from unactuated state 160 to actuated state 162 and/or are not compressed between two surfaces of a corresponding tool during such actuation.

In some examples of aerodynamic structures 30, blind fasteners 150 alone may be sufficient to operatively attach first skin region 40 and/or second skin region 60 to trailing edge structure 100. In some such examples, aerodynamic structures 30 may be, or may be referred to herein as being, free of an adhesive bond between first skin region 40 and trailing edge structure 100 that directly adheres first skin region 40 to trailing edge structure 100, that indirectly adheres first skin region 40 to trailing edge structure 100 between second skin region 60 and trailing edge structure 100, that directly adheres second skin region 60 to trailing edge structure 100, and/or that indirectly adheres second skin region 60 to trailing edge structure 100.

In some examples of aerodynamic structures 30, and as discussed, first skin region 40, second skin region 60, and/or trailing edge structure 100 may be formed from a composite material. In some such examples, first skin region 40, second skin region 60, and/or trailing edge structure 100 may be cured, pre-cured, and/or fully cured prior to assembly of aerodynamic structures 30. Stated another way, aerodynamic structures 30 may be free of a composite cure bond between first skin region 40 and trailing edge structure 100 and/or between second skin region 60 and the trailing edge structure.

As discussed, aerodynamic structures 30 may form and/or define at least a region of aerodynamic surfaces 19 of craft 10, such as aircraft 12 of FIG. 1. Aerodynamic structures 30 may have and/or define any suitable dimension, such as may be appropriate for a given craft 10. In some examples, aerodynamic structures 30 and/or trailing edge structures 100 thereof may define a longitudinal length, or a maximum extent, of at least 0.25 meters (m), at least 0.5 m, at least 1 m, at least 2 m, at least 3 m, at least 4 m, at least 5 m, at least 10 m, at most 50 m, at most 40 m, at most 30 m, at most 20 m, at most 10 m, and/or at most 5 m. An example of the longitudinal length is illustrated in FIG. 2 and indicated at 104. In some examples, aerodynamic structures 30 and/or trailing edge structures 100 thereof may define an aspect ratio of at least 10, at least 25, at least 50, at least 100, at least 200, at least 300, at least 400, at least 500, at most 1000, at most 900, at most 800, at most 700, at most 600, at most 500, at most 400, at most 300, at most 200, and/or at most 100. The aspect ratio may be defined as a ratio of longitudinal length 104 of FIG. 2 to a length of gap 80 of FIGS. 3-9.

A method of construction and/or assembly of aerodynamic structures 30 and/or of aerodynamic surfaces 19 and/or craft 10 that include aerodynamic structures 30 may include positioning trailing edge structure 100 and/or gap 80 between first skin edge 42 and second skin edge 62. This method then may include operatively attaching first skin region 40 and second skin region 60 to trailing edge structure 100 utilizing blind fasteners 150. Subsequent to this operative attachment, first subset 152 of blind fasteners 150 may operatively interconnect first skin region 40 and trailing edge structure 100, while second subset 154 of blind fasteners 150 may operatively interconnect second skin region 60 and trailing edge structure 100.

In some examples, aerodynamic structure 30 may define an exposed outer surface that defines an enclosed volume, which may include leading region void space 120. In some such examples, the operatively attaching may include operatively attaching such that unexposed end 158 of each blind fastener 150 is positioned within the enclosed volume. In some examples, and as discussed, the operatively attaching may include actuating each blind fastener 150 from, or only from, exposed end 156 thereof.

In some examples, the operatively attaching may include operatively attaching such that first interface 50 between first skin region 40 and trailing edge structure 100 is free of a corresponding adhesive bond between first skin region 40 and trailing edge structure 100. Additionally or alternatively, the operatively attaching may include operatively attaching such that second interface 70 between second skin region 60 and trailing edge structure 100 is free of a corresponding adhesive bond between second skin region 60 and the trailing edge structure 100.

In some examples, the method further may include providing, forming, and/or defining first skin region 40, second skin region 60, and/or trailing edge structure 100. In some such examples, this may include providing, forming, and/or defining a previously cured first skin region, a previously cured second skin region, and/or a previously cured trailing edge structure.

In some examples, the operatively attaching may include positioning each first blind fastener of the first subset 152 of the plurality of blind fasteners 150 within a corresponding first hole, which extends through both first skin region 40 and trailing edge structure 100, and subsequently actuating each first blind fastener from a corresponding first exposed end 156 to operatively attach first skin region 40 to trailing edge structure 100. Similarly, the operatively attaching also may include positioning each second blind fastener of the first subset 152 of the plurality of blind fasteners 150 within a corresponding second hole, which extends through both second skin region 60 and trailing edge structure 100, and subsequently actuating each second blind fastener from a corresponding second exposed end 156 to operatively attach second skin region 60 to trailing edge structure 100.

Illustrative, non-exclusive examples of inventive subject matter according to the present disclosure are described in the following enumerated paragraphs:

A1. An aerodynamic structure (30), comprising:
- a first skin region (40) that includes a first skin edge (42);
- a second skin region (60) that includes a second skin edge (62), wherein the first skin region (40) and the second skin region (60) are angled relative to one another and define a gap (80) between the first skin edge (42) and the second skin edge (62);
- a trailing edge structure (100) that extends within the gap (80) and between the first skin edge (42) and the second skin edge (62); and
- a plurality of blind fasteners (150), wherein:
  (i) a first subset (152) of the plurality of blind fasteners (150) operatively interconnects the first skin region (40) and the trailing edge structure (100); and
  (ii) a second subset (154) of the plurality of blind fasteners (150) operatively interconnects the second skin region (60) and the trailing edge structure (100).

A2. The aerodynamic structure (30) of paragraph A1, wherein the first skin region (40) includes, or is, at least one of:
(i) a first composite skin;
(ii) a first fiber-reinforced composite skin;
(iii) a first plurality of layered plies of composite material; and
(iv) a first cured, or pre-cured, composite skin.

A3. The aerodynamic structure (30) of any of paragraphs A1-A2, wherein the first skin region (40) defines a first skin inner surface (44), optionally wherein the first skin inner surface (44) at least one of:
(i) faces toward the second skin region (60);
(ii) faces toward the trailing edge structure (100);
(iii) is in contact with the trailing edge structure (100); and
(iv) is in direct physical contact with the trailing edge structure (100).

A4. The aerodynamic structure (30) of any of paragraphs A1-A3, wherein the first skin region (40) defines a first skin outer surface (46), optionally wherein the first skin outer surface (46) at least one of:
(i) faces away from the second skin region (60);
(ii) faces away from the trailing edge structure (100); and
(iii) is an aerodynamically smooth first skin outer surface.

A5. The aerodynamic structure (30) of any of paragraphs A1-A4, wherein the second skin region (60) includes, or is, at least one of:
(i) a second composite skin;
(ii) a second fiber-reinforced composite skin;
(iii) a second plurality of layered plies of composite material; and
(iv) a second cured, or pre-cured, composite skin.

A6. The aerodynamic structure (30) of any of paragraphs A1-A5, wherein the second skin region (60) defines a second skin inner surface (64), optionally wherein the second skin inner surface (64) at least one of:
(i) faces toward the first skin region (40);
(ii) faces toward the trailing edge structure (100);
(iii) is in contact with the trailing edge structure (100); and
(iv) is in direct physical contact with the trailing edge structure (100).

A7. The aerodynamic structure (30) of any of paragraphs A1-A6, wherein the second skin region (60) defines a second skin outer surface (66), optionally wherein the second skin outer surface (66) at least one of:
(i) faces away from the first skin region (40);
(ii) faces away from the trailing edge structure (100); and
(iii) is an aerodynamically smooth second skin outer surface.

A8. The aerodynamic structure (30) of any of paragraphs A1-A7, wherein the trailing edge structure (100) includes, is, consists of, or consists essentially of at least one of:
(i) a monolithic trailing edge structure;
(ii) a unitary trailing edge structure;
(iii) a one-piece trailing edge structure;
(iv) a continuously formed trailing edge structure; and
(v) an integrally formed trailing edge structure.

A9. The aerodynamic structure (30) of any of paragraphs A1-A8, wherein the trailing edge structure (100) is a multi-component trailing edge structure.

A10. The aerodynamic structure (30) of any of paragraphs A1-A9, wherein the trailing edge structure (100) includes, is, or is only at least one of:
(i) a composite trailing edge structure;
(ii) a fiber-reinforced composite trailing edge structure;
(iii) a trailing edge plurality of layered plies of composite material; and
(iv) a cured, or pre-cured, composite trailing edge structure.

A11. The aerodynamic structure (30) of paragraph A10, wherein the trailing edge plurality of layered plies of composite material includes at least one of:
(i) at least 2, at least 3, at least 4, at least 5, at least 6, or at least 7 layered plies of composite material; and
(ii) at most 20, at most 18, at most 16, at most 14, at most 12, at most 10, at most 9, at most 8, at most 7, at most 6, at most 5, or at most 4 layered plies of composite material.

A12. The aerodynamic structure (30) of any of paragraphs A1-A11, wherein the trailing edge structure (100) defines an outer trailing edge structure surface (102), and further wherein at least one of:
(i) the outer trailing edge structure surface (102) is in contact with the first skin region (40);
(ii) the outer trailing edge structure surface (102) is in direct physical contact with the first skin region (40);
(iii) the outer trailing edge structure surface (102) is in contact with the second skin region (60);
(iv) the outer trailing edge structure surface (102) is in direct physical contact with the second skin region (60); and
(v) the outer trailing edge structure surface (102) is an aerodynamically smooth outer trailing edge structure surface.

A13. The aerodynamic structure (30) of any of paragraphs A1-A12, wherein the trailing edge structure (100) includes:
(i) a leading region (110), which is positioned at least partially within the gap (80);
(ii) a trailing region (130), which defines a trailing edge (138) of the trailing edge structure (100); and
(iii) a transition region (140), which extends from the leading region (110) to the trailing region (130).

A14. The aerodynamic structure (30) of paragraph A13, wherein the leading region (110) defines a first leading region surface (112) and a second leading region surface (116), and further wherein at least one of:

(i) the first leading region surface (112) faces toward the first skin region (40);
(ii) the first leading region surface (112) is in contact with the first skin region (40);
(iii) the first leading region surface (112) is in direct physical contact with the first skin region (40);
(iv) the second leading region surface (116) faces toward the second skin region (60);
(v) the second leading region surface (116) is in contact with the second skin region (60); and
(vi) the second leading region surface (116) is in direct physical contact with the second skin region (60).

A15. The aerodynamic structure (30) of paragraph A14, wherein the first skin region (40) defines a first plurality of skin holes (48), wherein the first leading region surface (112) defines a first plurality of structure holes (114), and further wherein each blind fastener of the first subset (152) of the plurality of blind fasteners (150) extends through a corresponding first skin hole of the first plurality of skin holes (48) and also through a corresponding first structure hole of the first plurality of structure holes (114).

A16. The aerodynamic structure (30) of any of paragraphs A14-A15, wherein the second skin region (60) defines a second plurality of skin holes (68), wherein the second leading region surface (116) defines a second plurality of structure holes (118), and further wherein each blind fastener of the second subset (154) of the plurality of blind fasteners (150) extends through a corresponding second skin hole of the second plurality of skin holes (68) and also through a corresponding second structure hole of the second plurality of structure holes (118).

A17. The aerodynamic structure (30) of any of paragraphs A13-A16, wherein the leading region (110) at least partially defines a leading region void space (120), which extends between the first leading region surface (112) and the second leading region surface (116), wherein each blind fastener of the plurality of blind fasteners (150) includes a corresponding exposed end (156) and a corresponding unexposed end (158), and further wherein the corresponding unexposed end (158) is positioned within the leading region void space (120).

A18. The aerodynamic structure (30) of any of paragraphs A13-A17, wherein a given, or every, blind fastener of the plurality of blind fasteners (150) extends through a single, or only a single, corresponding hole within the leading region (110) of the trailing edge structure (100).

A19. The aerodynamic structure (30) of any of paragraphs A13-A18, wherein the leading region (110) includes a leading spar (122) that at least one of:
(i) extends at least partially, or completely, between the first skin region (40) and the second skin region (60); and
(i) extends along, or along an entirety of, a longitudinal length (104) of the trailing edge structure (100).

A20. The aerodynamic structure (30) of paragraph A19, wherein the leading spar (122) includes a leading C-spar.

A21. The aerodynamic structure (30) of paragraph A20, wherein the leading C-spar at least one of:
(i) is convex toward the trailing region (130); and
(ii) is concave toward the trailing region (130).

A22. The aerodynamic structure (30) of any of paragraphs A13-A21, wherein the trailing region (130) defines at least one of:
(i) a duckbill transverse cross-sectional shape; and
(ii) a wedge transverse cross-sectional shape.

A23. The aerodynamic structure (30) of any of paragraphs A13-A22, wherein the trailing region (130) at least one of:
(i) is free of a joint; and
(ii) is free of a joint at the trailing edge (138).

A24. The aerodynamic structure (30) of any of paragraphs A13-A23, wherein the trailing region (130) is defined by a/the plurality of trailing region plies of composite material (132), and further wherein at least one trailing region ply of the plurality of trailing region plies wraps around the trailing edge (138) of the trailing edge structure (100).

A25. The aerodynamic structure (30) of any of paragraphs A13-A24, wherein the trailing region (130) defines a first trailing region outer surface (134) and a second trailing region outer surface (136), optionally wherein the first trailing region outer surface (134) and the second trailing region outer surface (136) at least one of:
(i) taper toward the trailing edge (138); and
(ii) meet at the trailing edge (138).

A26. The aerodynamic structure (30) of any of paragraphs A13-A25, wherein the transition region (140) at least one of:
(i) tapers from the leading region (110) to the trailing region (130); and
(ii) monotonically tapers from the leading region (110) to the trailing region (130).

A27. The aerodynamic structure (30) of any of paragraphs A13-A26, wherein the transition region (140) defines a first exposed transition region surface (142) and a second exposed transition region surface (144), and further wherein the first exposed transition region surface (142) and the second exposed transition region surface (144) at least one of:
(i) taper from the leading region (110) to the trailing region (130) and
(ii) monotonically taper from the leading region (110) to the trailing region (130).

A28. The aerodynamic structure (30) of any of paragraphs A13-A27, wherein the transition region (140) includes a transition region spar (146), which is internal to the transition region (140).

A29. The aerodynamic structure (30) of any of paragraphs A1-A28, wherein each blind fastener of the plurality of blind fasteners (150) is configured to operatively attach a corresponding skin area of one of, or only one of, the first skin region (40) and the second skin region (60) to the trailing edge structure (100).

A30. The aerodynamic structure (30) of any of paragraphs A1-A29, wherein the plurality of blind fasteners (150) includes at least one of:
(i) a blind rivet;
(ii) a pull rivet;
(iii) a pop rivet;
(iv) a self-retaining fastener; and
(v) a self-tapping fastener.

A31. The aerodynamic structure (30) of any of paragraphs A1-A30, wherein the plurality of blind fasteners (150) at least one of:
(i) are not double-sided rivets; and
(ii) are not crush rivets.

A32. The aerodynamic structure (30) of any of paragraphs A1-A31, wherein the aerodynamic structure (30) is free of an adhesive bond at least one of:

(i) between the first skin region (40) and the trailing edge structure (100);
(ii) that directly adheres the first skin region (40) to the trailing edge structure (100);
(iii) that indirectly adheres the first skin region (40) to the trailing edge structure (100);
(iv) between the second skin region (60) and the trailing edge structure (100);
(v) that directly adheres the second skin region (60) to the trailing edge structure (100); and
(vi) that indirectly adheres the second skin region (60) to the trailing edge structure (100).

A33. The aerodynamic structure (30) of any of paragraphs A1-A32, wherein the aerodynamic structure (30) is free of a composite cure bond at least one of:
(i) between the first skin region (40) and the trailing edge structure (100); and
(ii) between the second skin region (60) and the trailing edge structure (100).

A34. The aerodynamic structure (30) of any of paragraphs A1-A33, wherein a/the longitudinal length (104) of the trailing edge structure (100) is at least one of:
(i) at least 0.25 meters (m), at least 0.5 m, at least 1 m, at least 2 m, at least 3 m, at least 4 m, at least 5 m, or at least 10 m; and
(ii) at most 50 m, at most 40 m, at most 30 m, at most 20 m, at most 10 m, or at most 5 m.

A35. The aerodynamic structure (30) of any of paragraphs A1-A34, wherein an aspect ratio of the trailing edge structure (100) is at least one of:
(i) at least 10, at least 25, at least 50, at least 100, at least 200, at least 300, at least 400, or at least 500; and
(ii) at most 1000, at most 900, at most 800, at most 700, at most 600, at most 500, at most 400, at most 300, at most 200, or at most 100.

A36. An aerodynamic surface (19) at least partially defined by the aerodynamic structure (30) of any of paragraphs A1-A35.

A37. The aerodynamic surface (19) of paragraph A36, wherein the aerodynamic surface (19) includes a control surface (20), optionally wherein the control surface (20) includes at least one of:
(i) a rudder (21);
(ii) an elevator (22);
(iii) an aileron (23);
(iv) a flap (24); and
(v) a spoiler (25).

A38. The aerodynamic surface (19) of paragraph A36, wherein the aerodynamic surface (19) includes a fixed surface (26), optionally wherein the fixed surface (26) includes at least one of:
(i) a winglet (27); and
(ii) a fixed region (28) of a wing (14).

A39. A craft (10) including the aerodynamic structure (30) of any of paragraphs A1-A36 or the aerodynamic surface (19) of any of paragraphs A37-A38, optionally wherein the craft (10) includes at least one of:
(i) an aircraft;
(ii) a helicopter;
(iii) a spacecraft; and
(iv) a marine craft.

B1. A method of forming an aerodynamic structure (30), the method comprising:
positioning a trailing edge structure (100) within a gap (80) between a first skin edge (42) of a first skin region (40) and a second skin edge (62) of a second skin region (60); and
operatively attaching the first skin region (40) and the second skin region (60) to the trailing edge structure (100) utilizing a plurality of blind fasteners (150), wherein, subsequent to the operatively attaching:
(i) a first subset (152) of the plurality of blind fasteners (150) operatively interconnects the first skin region (40) and the trailing edge structure (100); and
(ii) a second subset (154) of the plurality of blind fasteners (150) operatively interconnects the second skin region (60) and the trailing edge structure (100).

B2. The method of paragraph B1, wherein the aerodynamic structure (30) defines an exposed outer surface that defines an enclosed volume, and further wherein the operatively attaching includes operatively attaching such that an unexposed end (158) of each blind fastener of the plurality of blind fasteners (150) is positioned within the enclosed volume.

B3. The method of any of paragraphs B1-B2, wherein, during the operatively attaching, each blind fastener of the plurality of blind fasteners (150) is actuated only from a corresponding exposed end (156).

B4. The method of any of paragraphs B1-B3, wherein the operatively attaching includes operatively attaching such that at least one of:
(i) a first interface (50) between the first skin region (40) and the trailing edge structure (100) is free of a corresponding adhesive bond between the first skin region (40) and the trailing edge structure (100); and
(ii) a second interface (70) between the second skin region (60) and the trailing edge structure (100) is free of a corresponding adhesive bond between the second skin region (60) and the trailing edge structure (100).

B5. The method of any of paragraphs B1-B4, wherein the method further includes providing the first skin region (40), the second skin region (60), and the trailing edge structure (100), wherein the providing includes providing a previously cured first skin region, a previously cured second skin region, and a previously cured trailing edge structure.

B6. The method of any of paragraphs B1-B5, wherein the operatively attaching includes positioning each first blind fastener of the first subset (152) of the plurality of blind fasteners (150) within a corresponding first hole, which extends through both the first skin region (40) and the trailing edge structure (100), and subsequently actuating each first blind fastener of the first subset (152) of the plurality of blind fasteners (150) from a corresponding exposed first end of each first blind fastener to operatively attach the first skin region (40) to the trailing edge structure (100).

B7. The method of any of paragraphs B1-B6, wherein the operatively attaching includes positioning each second blind fastener of the second subset (154) of the plurality of blind fasteners (150) within a corresponding second hole, which extends through both the second skin region (60) and the trailing edge structure (100), and subsequently actuating each second blind fastener of the second subset (154) of the plurality of blind fasteners (150) from a corresponding exposed second end of each second blind fastener to operatively attach the second skin region (60) to the trailing edge structure (100).

B8. The method of any of paragraphs B1-B7, wherein the operatively attaching includes operatively attaching such that an/the unexposed end (158) of each blind fastener of the plurality of blind fasteners (150) is positioned within a void space that is at least partially, or even completely, defined within the trailing edge structure (100).

B9. The method of any of paragraphs B1-B8, wherein the aerodynamic structure (30) includes any suitable structure of any of the aerodynamic structures (30) of any of paragraphs A1-A36 or any of the aerodynamic surfaces (19) of any of paragraphs A37-A38.

C1. The use of a plurality of blind fasteners (150) to operatively attach a first skin region (40) and a second skin region (60) to a trailing edge structure (100) to at least partially define an aerodynamic structure (30).

C2. The use of any of the aerodynamic structures (30) of any of paragraphs A1-A36 with any of the methods of any of paragraphs B1-B9.

C3. The use of any of the methods of any of paragraphs B1-B9 to form any of the aerodynamic structures (30) of any of paragraphs A1-A36.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. An aerodynamic structure, comprising:
   a first skin region that includes a first skin edge;
   a second skin region that includes a second skin edge, wherein the first skin region and the second skin region are angled relative to one another and define a gap between the first skin edge and the second skin edge;
   a trailing edge structure that extends within the gap and between the first skin edge and the second skin edge, wherein the trailing edge structure includes:
   (i) a leading region, which is positioned at least partially within the gap and includes a leading spar that defines a leading edge of the trailing edge structure and extends along a longitudinal length of the trailing edge structure, wherein the leading spar is a leading C-spar that is concave toward a trailing edge of the trailing edge structure, wherein a central curve of the leading C-spar defines the leading edge;
(ii) a trailing region, which defines the trailing edge; and
(iii) a transition region, which extends from the leading region to the trailing region; and
a plurality of blind fasteners, wherein:
(i) a first subset of the plurality of blind fasteners operatively interconnects the first skin region and the trailing edge structure; and
(ii) a second subset of the plurality of blind fasteners operatively interconnects the second skin region and the trailing edge structure;
wherein the first subset of the plurality of blind fasteners and the second subset of the plurality of blind fasteners both extend through a region of the trailing edge structure that is on a trailing side of the central curve of the leading C-spar; and
wherein the trailing edge structure is a monolithic trailing edge structure that defines an entirety of the leading region, the trailing region, and the transition region.

2. The aerodynamic structure of claim 1, wherein the leading region defines a first leading region surface and a second leading region surface, and further wherein at least one of:
(i) the first leading region surface faces toward the first skin region;
(ii) the first leading region surface is in contact with the first skin region;
iii) the first leading region surface is in direct physical contact with the first skin region;
(iv) the second leading region surface faces toward the second skin region;
(v) the second leading region surface is in contact with the second skin region; and
(vi) the second leading region surface is in direct physical contact with the second skin region.

3. The aerodynamic structure of claim 2, wherein the first skin region defines a first plurality of skin holes, wherein the first leading region surface defines a first plurality of structure holes, wherein each blind fastener of the first subset of the plurality of blind fasteners extends through a corresponding first skin hole of the first plurality of skin holes and also through a corresponding first structure hole of the first plurality of structure holes, wherein the second skin region defines a second plurality of skin holes, wherein the second leading region surface defines a second plurality of structure holes, and further wherein each blind fastener of the second subset of the plurality of blind fasteners extends through a corresponding second skin hole of the second plurality of skin holes and also through a corresponding second structure hole of the second plurality of structure holes.

4. The aerodynamic structure of claim 2, wherein the leading region at least partially defines a leading region void space, which extends between the first leading region surface and the second leading region surface, wherein each blind fastener of the plurality of blind fasteners includes a corresponding exposed end and a corresponding unexposed end, and further wherein the corresponding unexposed end is positioned within the leading region void space.

5. The aerodynamic structure of claim 1, wherein the trailing region at least one of:
(i) is free of a joint; and
(ii) is free of a joint at the trailing edge.

6. The aerodynamic structure of claim 1, wherein the transition region at least one of:
(i) tapers from the leading region to the trailing region; and
(ii) monotonically tapers from the leading region to the trailing region.

7. The aerodynamic structure of claim 1, wherein each blind fastener of the plurality of blind fasteners is configured to operatively attach a corresponding skin area of only one of the first skin region and the second skin region to the trailing edge structure.

8. The aerodynamic structure of claim 1, wherein the plurality of blind fasteners includes at least one of:
(i) a blind rivet;
(ii) a pull rivet;
(iii) a pop rivet;
(iv) a self-retaining fastener; and
(v) a self-tapping fastener.

9. The aerodynamic structure of claim 1, wherein the aerodynamic structure is free of an adhesive bond at least one of:
(i) between the first skin region and the trailing edge structure;
(ii) that directly adheres the first skin region to the trailing edge structure;
(iii) that indirectly adheres the first skin region to the trailing edge structure;
(iv) between the second skin region and the trailing edge structure;
(v) that directly adheres the second skin region to the trailing edge structure; and
(vi) that indirectly adheres the second skin region to the trailing edge structure.

10. A craft including the aerodynamic structure of claim 1, wherein the craft includes at least one of:
(i) an aircraft;
(ii) a helicopter;
(iii) a spacecraft; and
(iv) a marine craft.

11. The aerodynamic structure of claim 1, wherein the transition region includes a transition region spar, which is internal to the transition region, and is configured to increase a rigidity of the trailing edge structure and to increase a resistance to deflection of a first exposed transition region surface and a second exposed transition region surface of the transition region when the trailing edge structure experiences an external load.

12. The aerodynamic structure of claim 1, wherein the trailing edge structure is a single-piece trailing edge structure.

13. A method of forming an aerodynamic structure, the method comprising:
positioning a trailing edge structure within a gap between a first skin edge of a first skin region and a second skin edge of a second skin region; and
operatively attaching the first skin region and the second skin region to the trailing edge structure utilizing a plurality of blind fasteners, wherein, subsequent to the operatively attaching:
(i) a first subset of the plurality of blind fasteners operatively interconnects the first skin region and the trailing edge structure; and
(ii) a second subset of the plurality of blind fasteners operatively interconnects the second skin region and the trailing edge structure;
wherein the trailing edge structure includes:
(i) a leading region, which is positioned at least partially within the gap and includes a leading spar that extends between the first skin region and the second skin region, defines a leading edge of the trailing edge structure, and extends along a longitudinal length of the trailing edge structure;

(ii) a trailing region, which defines a trailing edge of the trailing edge structure; and (iii) a transition region, which extends from the leading region to the trailing region;

wherein the leading spar is a leading C-spar that is concave toward the trailing edge of the trailing edge structure, wherein a central curve of the leading C-spar defines the leading edge;

further wherein the first subset of the plurality of blind fasteners and the second subset of the plurality of blind fasteners both extend through a region of the trailing edge structure that is on a trailing side of the central curve of the leading C-spar; and wherein the trailing edge structure is a monolithic trailing edge structure that defines an entirety of the leading region, the trailing region, and the transition region.

14. The method of claim 13, wherein the aerodynamic structure defines an exposed outer surface that defines an enclosed volume, and further wherein the operatively attaching includes operatively attaching such that an unexposed end of each blind fastener of the plurality of blind fasteners is positioned within the enclosed volume.

15. The method of claim 13, wherein, during the operatively attaching, each blind fastener of the plurality of blind fasteners is actuated only from a corresponding exposed end.

16. The method of claim 13, wherein the operatively attaching includes operatively attaching such that at least one of:

(i) a first interface between the first skin region and the trailing edge structure is free of a corresponding adhesive bond between the first skin region and the trailing edge structure; and (ii) a second interface between the second skin region and the trailing edge structure is free of a corresponding adhesive bond between the second skin region and the trailing edge structure.

17. The method of claim 13, wherein the operatively attaching includes positioning each first blind fastener of the first subset of the plurality of blind fasteners within a corresponding first hole, which extends through both the first skin region and the trailing edge structure, and subsequently actuating each first blind fastener of the first subset of the plurality of blind fasteners from a corresponding exposed first end of each first blind fastener to operatively attach the first skin region to the trailing edge structure.

18. The method of claim 13, wherein the operatively attaching includes positioning each second blind fastener of the second subset of the plurality of blind fasteners within a corresponding second hole, which extends through both the second skin region and the trailing edge structure, and subsequently actuating each second blind fastener of the second subset of the plurality of blind fasteners from a corresponding exposed second end of each second blind fastener to operatively attach the second skin region to the trailing edge structure.

19. The method of claim 13, wherein the operatively attaching includes operatively attaching such that an unexposed end of each blind fastener of the plurality of blind fasteners is positioned within a void space that is at least partially defined within the trailing edge structure.

20. The method of claim 13, wherein the transition region includes a transition region spar, which is internal to the transition region, and is configured to increase a rigidity of the trailing edge structure and to increase a resistance to deflection of a first exposed transition region surface and a second exposed transition region surface of the transition region when the trailing edge structure experiences an external load.

* * * * *